United States Patent [19]

Piskoti

[11] Patent Number: 5,013,808

[45] Date of Patent: May 7, 1991

[54] METHOD OF PREPARING ALKOXY SILANE AND A SILICONE CONTAINING RESIN

[75] Inventor: Charles Piskoti, Grand Blanc, Mich.

[73] Assignee: Genesee Polymers Corporation, Flint, Mich.

[21] Appl. No.: 205,559

[22] Filed: Jun. 7, 1988

Related U.S. Application Data

[63] Continuation of Ser. No. 13,364, Feb. 11, 1987, abandoned.

[51] Int. Cl.$^5$ .............................................. C08G 77/04
[52] U.S. Cl. ........................................ 528/23; 528/14; 528/15; 528/16; 528/31; 528/34; 528/37; 556/469
[58] Field of Search ....................... 528/34, 37, 23, 16, 528/14, 15, 31; 556/457, 458, 469, 455

[56] References Cited

U.S. PATENT DOCUMENTS

| | | | |
|---|---|---|---|
| 2,878,195 | 3/1959 | Hurd | 528/34 |
| 2,909,549 | 10/1959 | Bailey | 528/34 |
| 4,061,609 | 12/1977 | Bobear | 528/32 |

*Primary Examiner*—John C. Bleutge
*Assistant Examiner*—Ralph H. Dean, Jr.
*Attorney, Agent, or Firm*—Reising, Ethington, Barnard, Perry & Milton

[57] ABSTRACT

A method of preparing an alkoxysilane and a silicone resin includes the steps of combining a siloxane A having a first boiling point with a catalyst in a reaction vessel. A tri or tetra alkoxy functional silane monomer B is added to the vessel having a second boiling point. The contents of the vessel are heated. By a rearrangement reaction, an alkoxysilane is distilled from the vessel. The alkoxysilane has a boiling point which is lower than the mixture of the boiling points of the siloxane A, the silane monomer B and the temperature of the heated vessel. A silicone resin having alkoxy functionality and no silanol functionality is recovered from the vessel.

13 Claims, 1 Drawing Sheet

METHOD OF PREPARING ALKOXY SILANE AND A SILICONE CONTAINING RESIN

This application is a continuation, of application Ser. No. 013,364, filed Feb. 11, 1987, now abandoned.

TECHNICAL FIELD

The present invention relates to rearrangement reactions for the preparation of an alkoxysilane and a silicone resin.

BACKGROUND ART

There exists several methods for preparing alkoxysilanes and silicone resins. Conventionally, separate synthesis processes are carried out for each product.

For example, trimethylethoxysilane may be used as a hydrophobic treating agent for silica in defoamers, as a treatment for the dry powders in fire extinguishers to impart free flowing properties and other similar uses. Trimethylethoxysilane may also be used as an end blocker in silicone fluid synthesis and as a reactive silane in contact lens manufacturing processes. Conventionally, trimethylethoxysilane is made by reacting trimethylchlorosilane with ethanol in the presence of an acid receptor, such as pyridine. Yields by this method are low and accordingly, the product is very expensive.

Alternatively, chlorosilane may be reacted with alcohol to derive an alkoxysilane and hydrogen chloride gas as a byproduct.

Methyl silicone resin is a valuable resin which is useful as a hard coating for plastics and acrylics. Common methods for making the silicone resin include the reaction of an alkoxysilane and water resulting in hydrolysis and condensation. Some unreacted hydroxyl groups always remain and are highly reactive. Because of the reactivity of the free hydroxl groups of the resins, shelf stability of the resin is poor. If catalyst is added, the resin will cure in the container. Amines cannot be added to this system without the result of curing prematurely.

The present invention provides an efficient means for producing both a specific alkoxysilane and a silicone resin having commercial significance. The method combines readily available and inexpensive alkoxysilanes to generate alkoxysilanes and silicone resins which otherwise would be much more difficult to obtain and expensive to produce. The method can be used to make novel products as well as products previously available yet prohibitively expensive to utilize commercially.

The resins produced are free of reactive hydroxy groups. Therefore, amine groups can be incorporated into the molecules without premature gelling of the resin in the container. Shelf stability of the resin product is very good.

SUMMARY OF THE INVENTION

According to the present invention, there is provided a method for preparing an alkoxysilane and a silicone resin including the steps of combining a siloxane A having a first boiling point with a catalyst in a reaction vessel. A silane monomer B having tri or tetra alkoxy functionality and a second boiling point is added to the vessel. The contents of the vessel are heated. By a rearrangement reaction, an alkoxysilane is distilled from the vessel having a boiling point which is lower than the predetermined boiling points of the mixture of the silicone containing material A, the silane B and the temperature of the vessel. A silicone resin is recovered in the vessel.

FIGURE IN THE DRAWINGS

Other advantages of the present invention will be readily appreciated as the same becomes better understood by reference to the following description when considered in connection with accompanying drawing which is a schematic representation of a reaction apparatus for performing the subject method.

DETAILED DESCRIPTION OF THE INVENTION

Figure 1:
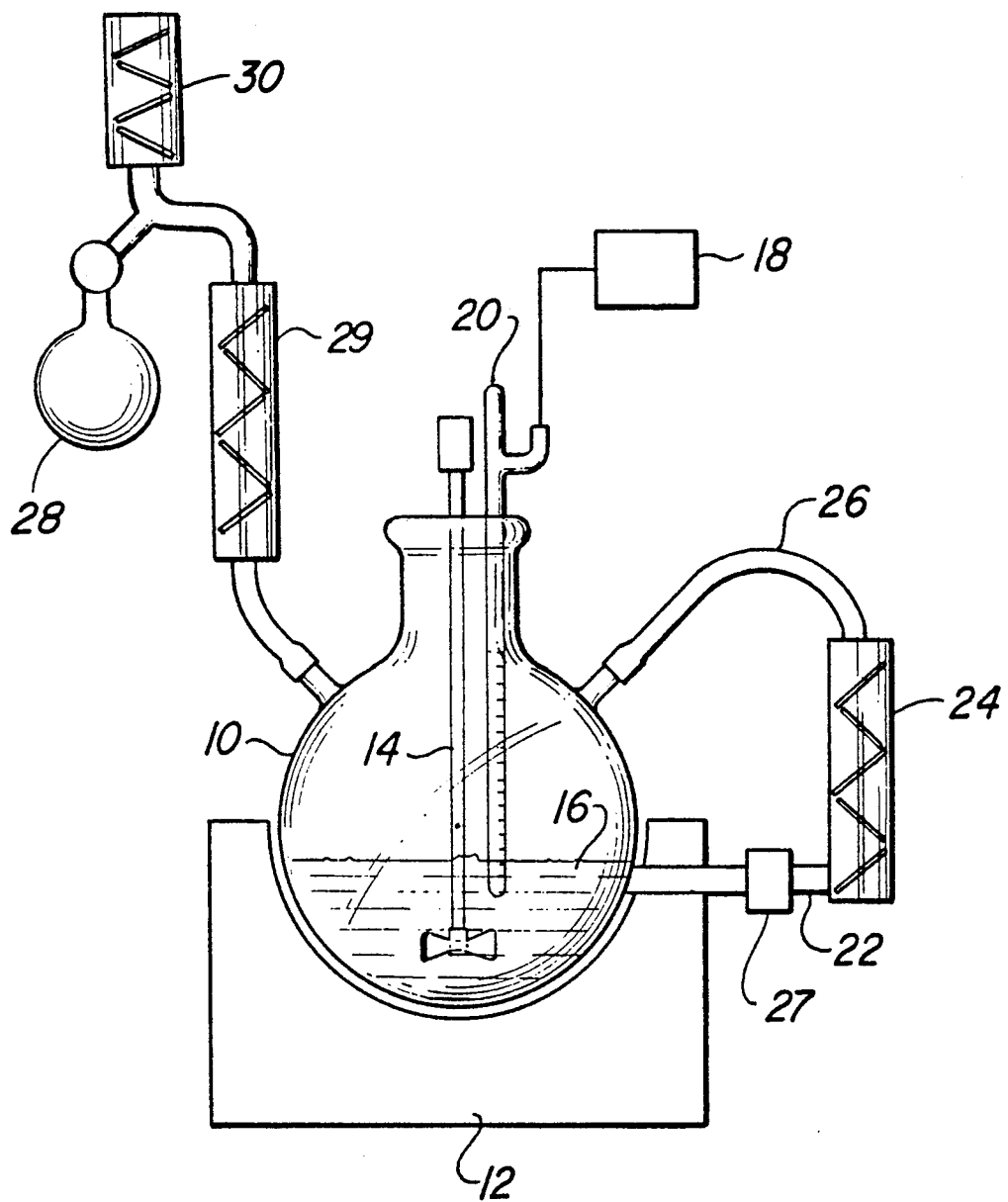

The present invention provides a method of preparing an alkoxysilane and a silicone resin by the steps of combining a siloxane A having a first boiling point with a catalyst in a reaction vessel, heating the contents of the vessel, and adding to the vessel a silane monomer B having tri or tetra functional alkoxy moeties as defined below and a second boiling point. By a rearrangement reaction, an alkoxysilane is distilled from the vessel, the alkoxysilane having a boiling point which is lower than the boiling points of the mixture of the silicone material A and the silane B. A silicone resin is recovered from the vessel. Hence, by selection of the precursor materials in view of their boiling point vis a vis the boiling point of the produced alkoxysilane, selected alkoxysilanes and resins can be produced.

The silane monomer B corresponds to the formula

$$R_n \text{Si(OR')}_{4-n}$$

where R is an alkyl, aromatic or substituted aromatic, amino alkyl, thioalkyl, or epoxyalkyl radical; R' is methyl or ethyl; and n is 0 or 1. Preferably, the alkyl functionality includes one to 10 carbon atoms and can be saturated or unsaturated containing aromatic and/or ethylenic unsaturation. Examples of silane monomers are methyltriethoxysilane, methyltrimethoxysilane, phenyl trimethoxysilane, vinyl trimethoxy silane, α-glycidoxypropyltrimethyoxysilane, allyl trimethoxy silane, aminopropyltrimethoxysilane, vinyltrimethoxy silane, 4,5-epoxycyclohexylethyl trimethoxy silane, ureidopropyl trimethoxy silane, ureidopropyl triethoxy silane, chloropropyl trimethoxy silane, and n-(βaminoethyl)-γ aminopropyltrimethoxysilane.

The silane monomer B, as defined above wherein n is 0 or 1, provides a chain extender and means for branching of the resin as the rearrangement reaction proceeds. It is critical that the silane monomer B have a formula where n is 0 or 1 for the silane to be tri or tetra functional. Addition of mono or difunctional alkoxysilane monomers merely result in extending of chains of the resin, but in no branching of the chain. However, the formula may include a mixture of silane monomers as defined above where at least one monomer includes in its formula n equal to 1 or 0 and a second monomer may be added wherein n equals 0 to 3. The second monomer may be added to extend the resin molecule, where n equals 2 or 3. The additional monomer may also be added to impart other chemical and physical properties to the solution. These chemical properties would be determined by the nature of the reactive groups on the silicone atom of the monomer. A mixture of many different monomers may be used to derive a product, as long as at least one of the monomers is defined by n equaling 0 or 1.

The silicone material A is a cyclic polysiloxane having the formula:

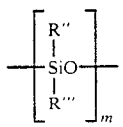

a straight chain siloxane corresponding to the formula:

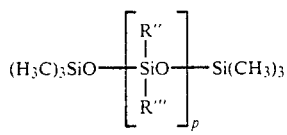

where R″ and R‴ are hydrogen or methyl and m is 3 to 10 and P is 0 to 1000.

Examples of suitable cyclic polysiloxanes include hexamethylcyclotrisiloxane, decamethylcyclopentasiloxane, and other similar cyclicpolysiloxane compounds.

Examples of straight chain siloxanes which are methyl end blocked are DC-200(350-cs) manufactured by Dow Corning Corp., and SF-96 (350cs) manufactured by General Electric, L-45 (1000cs) manufactured by Union Carbide and SWS-101 (10,000cs) manufactured by SWS Silicones Corp. Examples of methyl hydrogen straight chain siloxane fluids are Dow Corning 1107, Union Carbide L-31, and Mobay MH 20/30.

The siloxane A is initially combined with a catalyst in the reaction vessel. The catalyst may be an acid or base catalyst when the siloxane A is not a methyl hydrogen fluid. When the siloxane A is a methyl hydrogen fluid, the catalyst is preferably an acid catalyst. Examples of acid catalysts are sulphuric acid treated clay (Filtrol #13), manufactured by Filtrol Corporation of Cleveland, Ohio, sulfuric acid polystyrene resin (Amberlyst 15) manufactured by Rohm and Haas of Philadelphia, Pennsylvania and common Lewis acids such as ferric chloride or aluminum chloride. An example of a base catalyst is potassium hydroxide.

If free catalyst is utilized, it may be neutralized and removed by filtration. Supported catalysts such as Amberlyst 15 can be removed by simple filtration.

A nonreactive high boiling point solvent may be added to the reaction vessel prior to adding the silane monomer B to the vessel. It has been found through experimentation that the nonreactive high boiling point solvent increases the efficiency of the reaction. Examples of high boiling point solvents are mineral spirits, 140 Naptha manufactured by Ashland Chemical, Ohio and high boiling hydrocarbon solvents such as 1-dodecene alpha-olefin.

Unlike prior art syntheses, the present invention derives both alkoxysilanes and resins simultaneously by the rearrangement reaction. The reaction conditions create an environment causing continuous redistribution of the alkoxy groups between the reaction products in the reaction vessel. The temperature of the vessel is kept sufficiently high so that as the desired product having a boiling point below the reaction temperature is formed, the low boiling point product is boiled off and captured. Concurrently, the resin residue is formed. The removal and capture of the alkoxysilane product drives the reaction to completion as illustrated by the reaction:

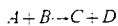

where D is boiled off thereby driving the reaction to produce more D as more C is concurrently produced. The alkoxysilane product is recovered by evaporation and condensation, and the resin is recovered as a residue at the bottom of the reaction vessel.

Specific examples of alkoxysilanes produced by the subject method are dimethyldiethoxysilane, trimethylethoxysilane, and methyldimethoxysilane. Of course, other alkoxysilanes may be produced by selection of different reactants. The silanes prepared have greater purity than those prepared by prior art methods. These silanes also have less acidity than silanes made by standard alcoholysis reactions. For example, alcoholysis of dimethyldichlorosilane yields dimethyldiethoxysilane and hydrochloric acid by the following reaction:

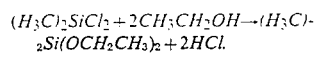

The formed hydrogen chloride is difficult to remove completely from the alkoxysilane product. Moreover, a side reaction of the formed hydrogen chloride and alcohol occurs and produces ethylchloride and water. The water formed reacts with the dimethyldiethoxysilane to generate polymeric species by the reaction:

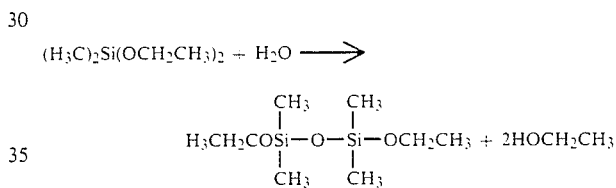

The side reaction lessens the yield of the desired alkoxysilane.

Additionally, since the present invention does not yield hydrogen chloride, no acid receptor is required with the present method. Whereas, in prior art, acid receptors have been used when it was desired to prevent acid species from being present.

The resin products are highly branched siloxane systems introduced during the rearrangement reaction by the tri and tetra alkoxy functional silanes monomers B. These are three dimensional molecules of repeating siloxane units where a single silane monomer B is used or of a variety of siloxane units where mixtures of silanes monomers are used.

Examples of specific resins produced by the present invention are methyl T-resins, phenyl T-resins and organofunctional T-resins. Novel resins can be produced dependent upon the creativity of addition and selection of reactants.

The present method provides for incorporation of organofunctionality in the resin structure by the choice of the starting alkoxysilanes. For example, amino propyl groups can be incorporated while still maintaining stability of the resin (shelf life) because the resin contains no active silanol moieties. Only alkoxyfunctional resins are produced. These alkoxy groups can be later reacted with hydroxyfunctional organic resins to yield silicone organic paint resins by simple transesterfication reactions.

Alternatively, "core shell" type resin structures can be synthesized by sequential use of different reactive silanes in the process. An example of such a reaction sequence is as follows:

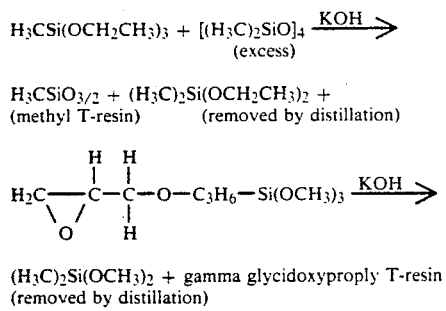

(1)

i.e., methyl T-resin core surrounded by gamma-glycydoxy propyl T-resin shell.

Other reactants can be sequentially added to derive a novel resin having the desired physical and chemical properties.

All of the resins produced have high purity due to the method of manufacture. The acid or base impurities are very low.

A specific example of a reaction apparatus for practicing the subject method is shown in FIG. 1 of the drawings. FIG. 1 shows a reaction vessel 10 disposed above a heating mantel 12. A mixer 14 extends into the vessel 10 for continuously mixing the reaction materials 16. A source of nitrogen 18 is operatively connected to the reaction vessel 10 for supplying an inert atmosphere of nitrogen. A noninert atmosphere may also be used. A thermometer 20 extends into the reaction vessel for constant temperature determinations. The reaction vessel 10 is in fluid communication through tube 22 with a column 24. The column 24 contains a catalyst therein. The catalyst can be in the form of beads which are copolymerized with the catalyst. Common examples of trapped catalysts are sulfuric acid treated clay or sulfuric acid polystyrene resin. The circulation system is completed by the connecting hose 26 interconnecting the column 24 with the reaction vessel 10. A pump 27 circulates the reaction mixture from the vessel to the column 24.

Other reaction apparatus can be used for practicing the subject method. For example, catalyst may be added directly to the reaction vessel and later neutralized and/or filtered out from the reacted products.

In accordance with present invention, the silane monomer B and the siloxane A are mixed in the reaction vessel 10. The column 24 is in series with the reaction vessel 10. The column 24 includes the catalyst trapped therein The reaction vessel 10 is heated by the heating mantel 12. The mixture of the siloxane A and silane monomer B are circulated through the column 24 and back into the reaction vessel 10. The alkoxysilane, having a lower boiling point than either the silane monomer B or siloxane A is distilled off from the reaction vessel through a distillation column 29 and water condensor 30 and collected in container 28. The resin produced as a by-product is collected in the bottom of the reaction vessel 10.

Critical to the function of the subject method is that the produced alkoxysilane have a lower boiling point than the mixture of the siloxane A or the silane monomer B.

The siloxane A can be maintained in excess, being heated in combination with the catalyst prior to the addition of the silane monomer B Upon the addition of the silane monomer B, the reaction proceeds almost instantaneously. Alternatively, the reactants can be mixed together prior to heating.

The rearrangement reaction proceeds as the tri or tetra functional silane monomer B donates the alkoxy groups to the siloxane A. The derived lower boiling point alkoxysilane product is boiled out of the reaction vessel. As the alkoxysilane product is removed, the reaction is continuously driven to completion. Additional silane monomers B and siloxane A may be sequentially added to the reaction vessel to further develop the resin while producing additional alkoxy silane product of the same or different formula, dependent upon the formula of the silane monomers B added.

The heated temperatures of the contents of the vessel are determined by the boiling points of the constituent siloxane A and silane monomer B. The vessel must be heated above the boiling point of the alkoxysilane product but maintained below the boiling point of the mixture of the siloxane A and silane monomer B.

EXAMPLES

Example 1

Preparation of Methydiethoxysilane and T-Resin

The preparation of a methydiethoxysilane and methyl T-resin was carried out by the following reaction:

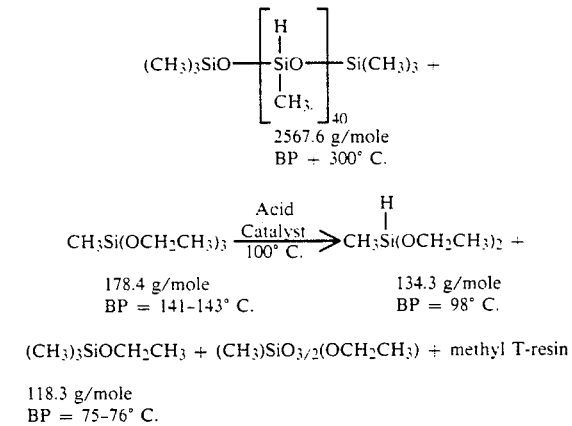

$(CH_3)_3SiOCH_2CH_3 + (CH_3)SiO_{3/2}(OCH_2CH_3) +$ methyl T-resin 118.3 g/mole
BP = 75–76° C.

Specifically the following ingredients were combined 500 g methyl hydrogen fluid 1804 g methyl triethoxy silane, Kay Fries (MTES) a) 70 g Amberlyst 15 (Rohm and Haas) or b) 23 g Filtrol 13 washed three times with MTES to remove water.

Theoretically, 1046.1 grams of the methyldiethoxysilane can be produced if all of the methyl hydrogen fluid is converted. 46.1 grams of the trimethylethoxysilane is produced if all of the methyl hydrogen fluid end blocker is converted. The following is the results of heating the mixture at 100° C. after three hours and after four and a half hours utilizing as a catalyst either 70 grams of Amberlyst 15 catalyst or 23 grams of washed Filtrol 13.

| Species | Grams After 3 Hours | Grams After 4.5 Hours |
|---|---|---|
| (a) 70 g Amberlyst 15 Catalyst | | |
| Ethanol | 10.7 | 8.5 |
| Diethyl ether | 6.2 | 9.5 |
| Trimethylethoxy- | 16.5 | 19.1 |

-continued

| Species | Grams After 3 Hours | Grams After 4.5 Hours |
|---|---|---|
| silane | | |
| Methyldiethoxysilane | 179.0 | 256.4 |
| Methyltriethoxysilane | 1147.0 | 868.8 |
| Dimethyltetraethoxydisiloxane | 249.1 | 312.0 |
| MDES adduct of MTES | 246.1 | 302.3 |
| BALANCE: Oligomers | | |
| (b) 23 grams Washed Filtrol 13 | | |
| Ethanol | 21.1 | 18.9 |
| Diethylether | 5.9 | 9.0 |
| Trimethylethoxysilane | 13.8 | 16.5 |
| Methyldiethoxysilane | 100.9 | 130.6 |
| Methyltriethoxysilane | 1645.3 | 1460.0 |
| Dimethyltetraethoxydisiloxane | 166.0 | 196.0 |
| MDES adduct of MTES | 146.0 | 183.0 |
| BALANCE: Oligomers | | |

The advantage of the Amberlyst 15 over the Filtrol 13 is almost 2 to 1 in converting the methyl hydrogen fluid to methydiethoxysilane.

Example 2

Preparation of Trimethylethoxy Silane and Ethoxy Functional Methyl T-Resin

The reaction can be characterized by the following formulation:

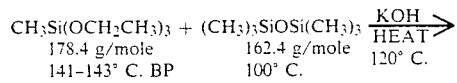

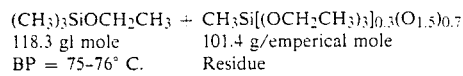

Specifically the following ingredients were combined: 6265 g Methyltriethoxysilane, Union Carbide A-162 86.5 pure, 3 1% ethanol 5992 g Hexamethyldisiloxane, Dow Corning Q-2-1096 (in small aliquots) 57 g KOH Baker Reagent Grade 2632 g 37 Mineral Spirits (Gage products) at end of reaction.

7,825 g of methyl T-resin was recovered. NMR analysis of the stripped resin gave the following correct pattern of peaks: methylene quartet 3.65-4.00ppm, methyl triplet at 1.05-1.30ppm and Si-methyl singlet at 0.10ppm. Integration showed a ratio of 2:3:4.2 instead of 2:3:3.3 protons. This is to be expected as the methyltriethoxysilane used was already partially condensed. 11,350 ml (95.93% theoretical) of the distillate CH$_3$SiOCH$_2$CH$_3$ silane was recovered 200ml was recovered at 65° to 66° C., 125 ml was recovered at 75° to 110° C., and the remaining volume was recovered at 70° to 75° C.

Example 3

Preparation of Dimethyldiethoxysilane and Ethoxy Functional Methyl T-Resin

The following reactants were combined:
2052.0 g Kay Fries Methyl Triethoxysilane (MTES)
1023.8 g Dow Corning Octamethylcyclotetrasiloxane, (D$_4$)
514.1 g 1-decene (Alpha-Olefin) (Ethyl Corporation)
514.1 g Aldrich Chemical Isopropyl Benzene (Aldrich Chemical)
0.9 g Baker Reagent Grade KOH 87% pure.
The following products were obtained:
1866.3 g Dimethyldiethoxysilane, produced 91.15% of theoretical yield
1065.7 g Stripped resin collected, 103.65% of theoretical yield
1205.0 g Volatiles collected containing 15.7 g Dimethyldiethoxysilane and 94.3 g low boiling components of resin.

NMR analysis showed methoxylene quartet at 3.67–4.03ppm, methyl triplet at 1.08–1.32ppm and Si-methyl singlet at 0.13ppm. Integration gives a ratio of 2:3:5 protons which is the expected ratio.

Example 4

Preparation of A 3-Glycidoxy Propyl Functional Methoxy Functional Methyl T-Resin and Dimethyldimethoxysilane The following reactants were combined in a reaction vessel:
1175.2 g Kay Fries Methyl Trimethoxysilane (MTMS)
679.9 g Dow Corning Z-6040, 3-Glycidoxy propyl trimethoxysilane
1023.8 g Mazer SF-V (Octamethyl Cyclotetrasiloxane)
937.5 g Ethyl 1-decene C10 Alpha Olefin (Ethyl Corporation)
100.0 g Xylenes p1 0.9 g Baker Reagent Grad KOH 87% pure.

The following products were collected: 1,399.3 g of dimethyldimethoxysilane, 1,321 g of stripped resin (stripped to 150° C. at full vacuum, 89.28% of theoretical). The volatiles contained 27.3 g of methyltrimethoxysilane, xylene, 1-decene and low boiling volatiles of the resin.

The epoxy equivalent weight was 486.45 grams of stripped resin per epoxide group. (Theoretical is 360 grams/epoxide)

Example 5

Preparation of an N-2-Aminoethyl-3-Amino Propyl Functional Methoxy Reactive Methyl T-Resin and Dimethyldimethoxysilane The following reactants were combined: 652.0 g N-2-Aminoethyl-3-Amino Propyl Trimethoxy Silane, Kay Fries Damo (Distilled) 98% pure
1175.2 g Methyltrimethoxysilane, Kay Fries MTMS 99.7% pure
937.5 g Xylene (Gage Products)
1023.8 g Octamethylcyclotetrasiloxane (D$_4$) (Dow Corning)
0.6 g KOH Baker reagent 87% pure
1,516.3 g (94.5% theoretical) of dimethyldimethoxysilane was recovered. The potassium hydroxide was neutralized with 0.5 g acetic anhydride. The color of the resin solution was very light yellow. The stripped resin is a solid under 60° C., but can be redissolved in xylene.

What is claimed is:

1. A method of preparing an alkoxysilane and a silicone resin consisting essentially of the steps of: combining a cyclic or straight chain siloxane A having a first boiling point with a catalyst in a reaction vessel and a silane monomer B having tri or tetra alkoxy functionality and a second boiling point; distilling from the vessel an alkoxysilane product of a rearrangement reaction having a boiling point which is lower than the boiling point of the mixture of the siloxane A and the silane monomer B to drive the reaction towards completion; and recovering from the vessel a silicone resin having alkoxy functionality and no active silanol functionality.

2. A method as set forth in claim 1 wherein the silane monomer B corresponds to the formula

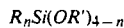

where R is a saturated alkyl, unsaturated alkyl, phenyl, amino alkyl, thioalkyl, or epoxyalkyl radical; R' is methyl or ethyl; and n is 0 or 1.

3. A method as set forth in claim 1 wherein the siloxane A is a cyclic polysiloxane corresponding to the formula,

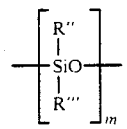

or a straight chain siloxane corresponding to the formula

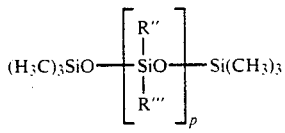

where R" and R''' are hydrogen or methyl and m is 3 to 10 and P is 0 to 1000.

4. A method as set forth in claim 3 wherein R" and R''' are methyl and the catalyst is either an acidic or basic catalyst.

5. A method as set forth in claim 3 wherein the siloxane A is a straight chain siloxane and P is 0 and the catalyst is either an acidic or basic catalyst.

6. A method as set forth in claim 3 wherein R" is methyl and R''' is hydrogen, m is 3 to 10 and P is 1 to 1000 and the catalyst is an acidic catalyst.

7. A method as set forth in claim 1 further including the step of adding a nonreactive high boiling point solvent to the reaction vessel prior to adding the silane monomer B to the vessel.

8. A method as set forth in claim 7 wherein the solvent is 1-dodecene alpha-olefin.

9. A method as set forth in claim 1 further including the steps of mixing the siloxane A and the silane monomer B in the reaction vessel (10), the reaction vessel (10) including a column (24) in series therewith, the column (24) including the catalyst trapped therein; heating the reaction vessel (10); circulating the heated mixtures of the silane B and siloxane A through the column (24) and back into the reaction vessel (10); distilling off and collecting the alkoxysilane from the reaction vessel (10); and collecting the resin in the reaction vessel (10).

10. A method as set forth in claim 9 wherein the trapped catalyst is sulphuric acid treated clay.

11. A method as set forth in claim 9 wherein the trapped catalyst is sulphuric acid-polystyrene resin.

12. A method as set forth in claim 1 wherein the vessel is sealed and contains an inert atmosphere.

13. A method as set forth in claim 12 wherein the inert atmosphere is nitrogen.

* * * * *